(12) United States Patent
Wu

(10) Patent No.: US 11,914,735 B2
(45) Date of Patent: Feb. 27, 2024

(54) SERVER WITH DATA SECURITY MEASURE

(71) Applicant: MITAC COMPUTING TECHNOLOGY CORPORATION, Taoyuan (TW)

(72) Inventor: Wei-Hong Wu, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 370 days.

(21) Appl. No.: 17/466,542

(22) Filed: Sep. 3, 2021

(65) Prior Publication Data

US 2022/0075887 A1  Mar. 10, 2022

(30) Foreign Application Priority Data

Sep. 7, 2020 (TW) .................................. 109130544

(51) Int. Cl.
| | |
|---|---|
| *G06F 21/00* | (2013.01) |
| *G06F 7/04* | (2006.01) |
| *G06F 21/44* | (2013.01) |
| *G06F 21/62* | (2013.01) |

(52) U.S. Cl.
CPC .......... *G06F 21/6218* (2013.01); *G06F 21/44* (2013.01)

(58) Field of Classification Search
CPC .................................. G06F 8/44; G06F 21/577
USPC .......................................................... 726/19
See application file for complete search history.

(56) References Cited

U.S. PATENT DOCUMENTS

| | | | | |
|---|---|---|---|---|
| 2008/0194235 | A1* | 8/2008 | Dalsgaard ............ | H04J 11/0086 455/411 |
| 2013/0078912 | A1* | 3/2013 | San Vicente ........... | G16H 40/67 455/39 |
| 2019/0109713 | A1* | 4/2019 | Clark .................... | G06F 16/182 |
| 2019/0109714 | A1* | 4/2019 | Clark .................... | H04L 67/565 |
| 2019/0109820 | A1* | 4/2019 | Clark .................... | H04L 9/0861 |
| 2021/0377220 | A1* | 12/2021 | Tiedeken ............ | H04L 63/0876 |
| 2022/0086741 | A1* | 3/2022 | Liao ........................ | H04W 4/44 |

FOREIGN PATENT DOCUMENTS

| | | | | | |
|---|---|---|---|---|---|
| CN | 103853678 | A | | 6/2014 | |
| CN | 106919858 | A | | 7/2017 | |
| CN | 107148021 | A | * | 9/2017 | |
| CN | 105532039 | B | * | 4/2019 | ............ H04W 12/08 |

\* cited by examiner

*Primary Examiner* — Haresh N Patel
(74) *Attorney, Agent, or Firm* — Lando & Anastasi, LLP

(57) ABSTRACT

A server includes a management module that includes a memory device and that is configured to be connected to multiple data storage devices. The management module is configured to perform an initialization procedure, in which the management module obtains multiple pieces of storage identifier information corresponding to the data storage devices, determines, for each of the pieces of storage identifier information, whether the piece of storage identifier information matches any piece of default identifier information contained in a list stored in the memory device, and generates piece(s) of log data for matched piece(s) of storage identifier information.

19 Claims, 4 Drawing Sheets

SERVER WITH DATA SECURITY MEASURE

CROSS-REFERENCE TO RELATED APPLICATION

This application claims priority of Taiwanese Invention Patent Application No. 109130544, filed on Sep. 7, 2020.

FIELD

The disclosure relates to a server, and more particularly to a server with data security measure.

BACKGROUND

A conventional server includes a baseboard management controller (BMC) that manages multiple hard disk drives (HDDs) through multiple bus-channel switches (e.g., peripheral component interconnect express (PCIe) switches) which are respectively connected with the HDDs. The conventional server may have a safety risk that when an unauthorized HDD has been cunningly installed in the server (e.g., by maliciously replacing an authorized HDD with the unauthorized HDD during operation of the server), the BMC may possibly read/write data from/to the unauthorized HDD, which endangers security of the data stored in the conventional server. Besides, the conventional server has a fixed number of bus-channel switches that corresponds to and limits the number of HDDs that may be managed in the server, so it is difficult to utilize the server to manage a larger number of HDDs exceeding the fixed number of the bus-channel switches when such is desired.

SUMMARY

Therefore, an object of the disclosure is to provide a server that can alleviate at least one of the drawbacks of the prior art.

According to one aspect of the disclosure, the server includes a management module. The management module includes a memory device storing an allow-list that contains multiple pieces of default identifier information and a verification code. The management module is configured to be connected to a plurality of data storage devices. Each of the plurality of data storage devices stores a storage device code and a piece of storage identifier information that corresponds to the data storage device, and is in one of an enabled state where access thereto is allowed and a disabled state where access thereto is not allowed. The management module is further configured to, when the management module is performing an initialization procedure and when the management module is connected to multiple data storage devices from among the plurality of data storage devices, for each of the multiple data storage devices that is in the enabled state, obtain the piece of storage identifier information corresponding to the data storage device. The management module is further configured to, when the management module is performing an initialization procedure and when the management module is connected to multiple data storage devices from among the plurality of data storage devices, for each of the multiple data storage devices that is in the enabled state, determine whether the piece of storage identifier information corresponding to the data storage device matches any of the multiple pieces of default identifier information contained in the allow-list stored in the memory device, so as to generate a determination result indicating whether said piece of storage identifier information matches any of the multiple pieces of default identifier information, and generate a piece of log data when the determination result indicates that said piece of storage identifier information matches one of the multiple pieces of default identifier information.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
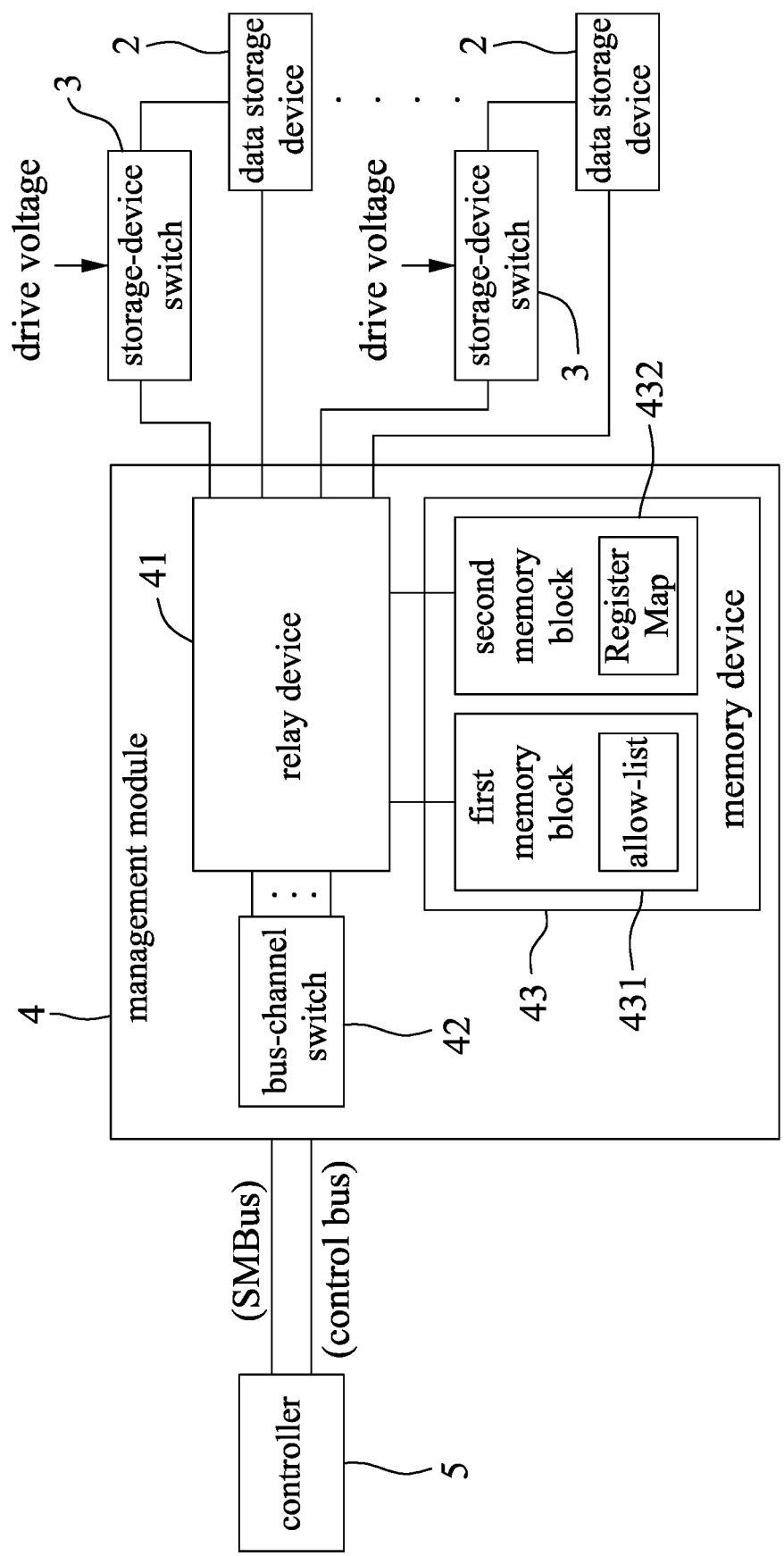
FIG. 1 is a block diagram that exemplarily illustrates a server according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 exemplarily illustrates a server with data security measure according to an embodiment of the disclosure. As shown in FIG. 1, the server (which is a server system) includes multiple data storage devices 2, multiple storage-device switches 3, a management module 4 and a controller 5. The management module 4 is connected to the multiple storage-device switches 3, and is connected to the controller 5 through a system management bus (SMBus) for transmitting data and a control bus for transmitting instructions or commands. According to some embodiments, the controller 5 may be, for example, a baseboard management controller (BMC) or a redundant array of independent disks (RAID) controller, and the control bus may be, for example, an inter-integrated circuit ($I^2C$), a serial general purpose input/output (SGPIO) bus, a low pin count (LPC) bus or an intelligent platform management interface (IPMI) bus.

The data storage devices 2 may be installed in the server by inserting the data storage devices 2 in multiple slots of the server that are each configured to connect one data storage device 2 to the management module 4 and to a different one of the storage-device switches 3. The data storage devices 2 that are connected to the storage-device switches 3 may each be a non-volatile storage (e.g., a hard disk drive (HDD) or a solid-state drive (SSD)). Each of the data storage devices 2 stores a storage device code and a piece of storage identifier information corresponding to the data storage device 2, wherein the storage device code serves as a verification password or a key, and the piece of storage identifier information includes a vendor identifier (VID) of the data storage device 2. According to some embodiments, the piece of storage identifier information may also include a device address of the data storage device 2, wherein the device address may be an address assigned to the data storage device 2, or an address assigned to a slot, into which the data storage device 2 is inserted.

The multiple storage-device switches 3 are each configured to be connected to one of the data storage devices 2, and are each configured to receive a drive voltage (e.g., from an external voltage source). The storage-device switches 3 are individually controlled by the management module 4 to be turned on or turned off. A turned-on storage-device switch 3 receives the drive voltage and provides the drive voltage to the data storage device 2 that is connected to the storage-device switch 3, so that the data storage device 2 is in an enabled state where access to the data storage device 2 is allowed; on the other hand, a turned-off storage-device switch 3 does not provide the drive voltage to the data storage device 2 and thus the data storage device 2 is in a disabled state where access to the data storage device 2 is not allowed. That is, for each of the data storage devices 2, the data storage device 2 is in the enabled state only when the storage-device switch 3 connected thereto is turned on, and is in the disabled state when the storage-device switch 3 connected thereto is turned off.

The management module 4 includes a relay device 41, and a bus-channel switch 42 and a memory device 43 that are connected to the relay device 41. According to some embodiments of the disclosure, the management module 4 may be implemented by a programmable logic device (PLD) that is, for example, a field programmable gate array (FPGA) or a complex programmable logic device (CPLD), and the relay device 41 and the bus-channel switch 42 may be electronic circuits that are constructed by using a hardware description language (HDL), such as Verilog, for logic synthesis.

The relay device 41 is connected to all the storage-device switches 3. According to some embodiments, the relay device 41 may include multiple bus channels respectively connected to the storage-device switches 3 for controlling the storage-device switches 3. In an embodiment, the storage-device switches 3 are integrated within the management module 4, and are implemented by the management module 4 executing firmware for controlling logic elements of the management module 4.

Figure 2:
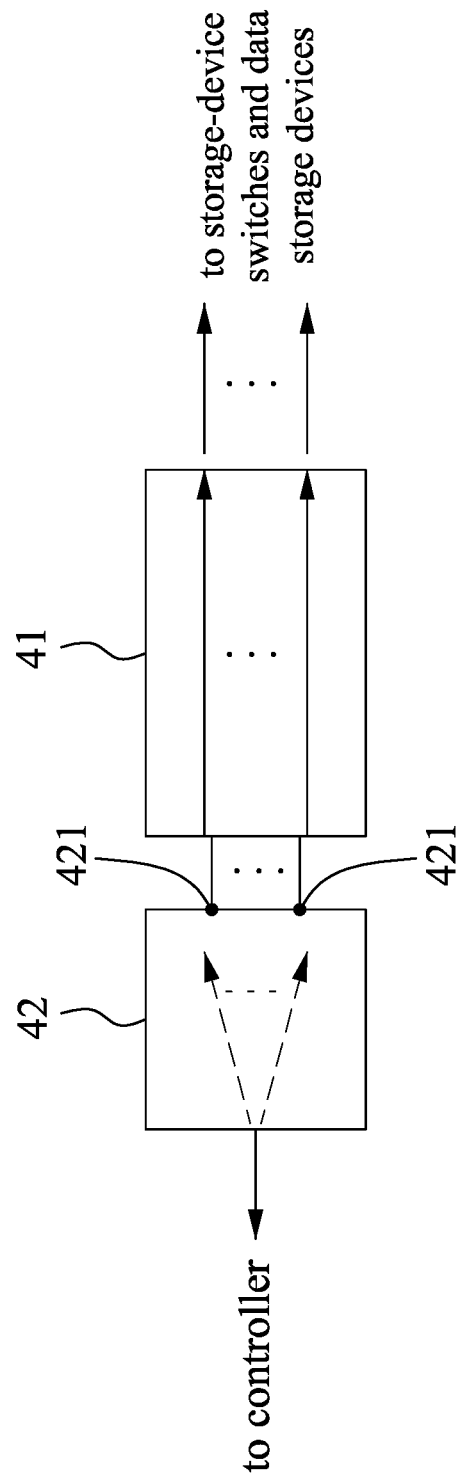
FIG. 2 is a schematic view that exemplarily illustrates a bus-channel switch and a relay device of the server according to an embodiment of the disclosure.

The bus-channel switch 42 is connected to the SMBus at a first side, and to the relay device 41 through multiple sets of connecting lines at a second side, wherein a number of the sets of connecting lines equals the number of the storage-device switches 3 that are controlled by the management module 4. FIG. 2 exemplarily illustrates the bus-channel switch 42 and the relay device 41 in more detail according to an embodiment of the disclosure. As shown in FIG. 2, the bus-channel switch 42 includes multiple communication ports 421 that are respectively connected to the bus channels of the relay device 41 (indicated by arrows in the relay device 41) respectively through the sets of connecting lines (indicated by straight lines between the bus-channel switch 42 and the relay device 41), in order to be connected respectively to the storage-device switches 3 and to the data storage devices 2 (see FIG. 1) connected to the storage-device switches 3. That is, the bus-channel switch 42 may be connected to the storage-device switches 3 and also to the data storage devices 2 connected to the storage-device switches 3 through the communication ports 421 and further through the bus channels of the relay device 41. The bus-channel switch 42 is configured to be controlled by the relay device 41 to selectively connect the controller 5 with at least one of the communication ports 421. According to some embodiments, controlling the bus-channel switch 42 by the relay device 41 may be based on an instruction transmitted from the controller 5 to the relay device 41. Each of the communication ports 421 is assigned a port number that corresponds to the respective one of the bus channels of the relay device 41, the respective one of the storage-device switches 3, and one of the slots of the server that corresponds to the respective one of the storage-device switches 3. The port number may also correspond to the data storage device 2 that is inserted in the one of the slots and that is connected to the respective one of the storage-device switches 3. Possible connections between the controller 5 and the communication ports 421 are exemplarily illustrated in FIG. 2 by arrow lines inside the bus-channel switch 42.

Returning back to FIG. 1, the memory device 43 includes a first memory block 431 and a second memory block 432. The first memory block 431 is non-volatile memory which may be implemented by, for example, read-only memory (ROM), flash memory or non-volatile random access memory (NVRAM), and stores an allow-list that contains multiple pieces of default identifier information, each of which is related to at least one authorized data storage device that has been authorized to be installed in the server and to be accessible by the management module 4. In an embodiment, each of the pieces of default identifier information includes a VID. In another embodiment, each of the pieces of default identifier information includes a data-storage-device type (which indicates a type of the data storage device) or a data-storage-device model (which indicates a model of the data storage device) that corresponds to one or more VIDs.

The first memory block 431 also stores at least one verification code. In an embodiment, the at least one verification code stored in the first memory block 431 includes multiple verification codes respectively corresponding to the multiple pieces of default identifier information in the allow-list. In another embodiment, the at least one verification code stored in the first memory block 431 is a single verification code that corresponds to every piece of default identifier information in the allow-list. The second memory block 432 is volatile memory which may be implemented by, for example, dynamic random access memory (DRAM) or static random access memory (SRAM), and stores a register map containing information related to the data storage devices 2 that are installed in the server and that have passed an identity verification carried out in an initialization procedure.

Figure 3:
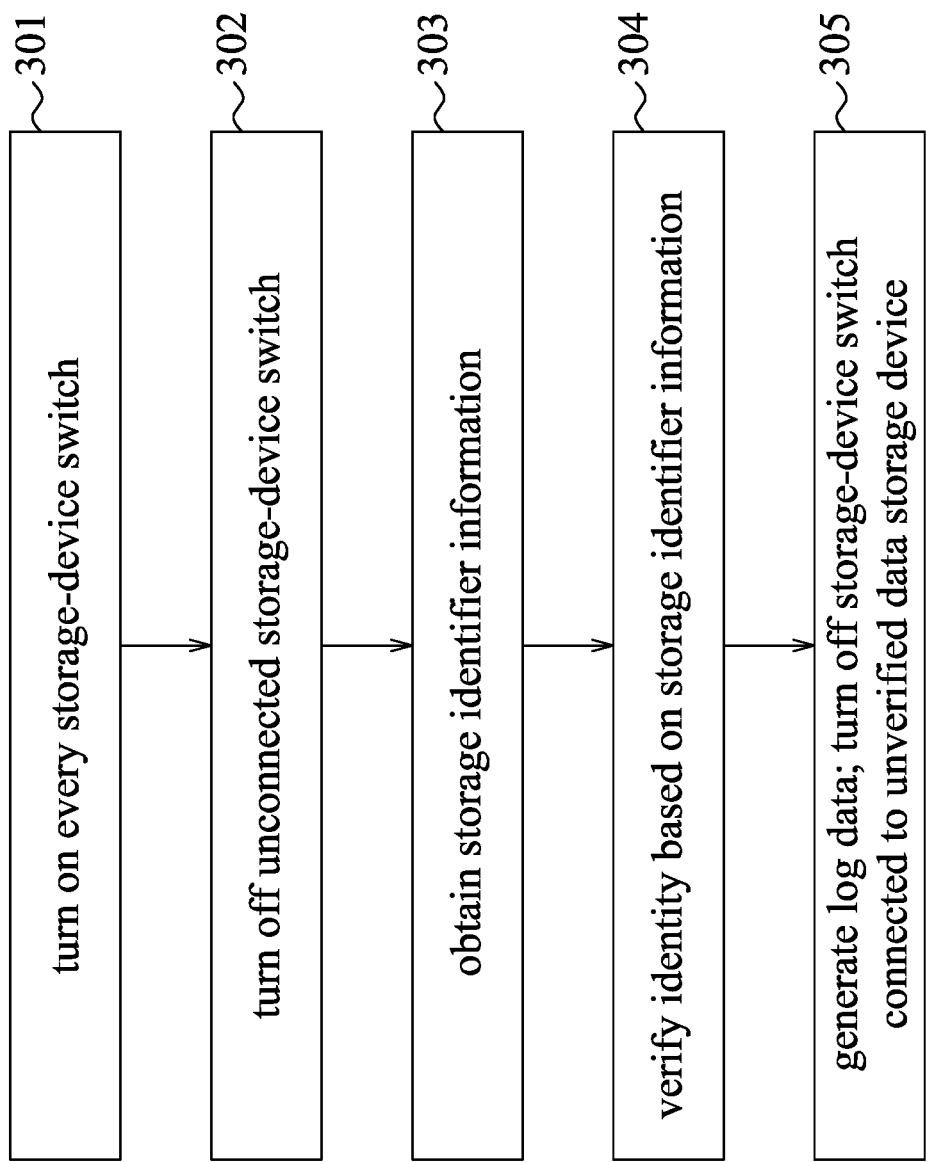
FIG. 3 is a flow chart that exemplarily illustrates an initialization procedure to be performed by the server according to an embodiment of the disclosure.

The management module 4 is configured to perform the initialization procedure (e.g., by executing an initialization program stored in a non-volatile memory device that is internal or external to the management module 4) when the server is powered on. FIG. 3 exemplarily illustrates the initialization procedure according to an embodiment of the disclosure. Referring to FIG. 3, the initialization procedure includes Steps 301-305.

First, in Step 301, the relay device 41 of the management device 4 turns on every storage-device switch 3 in order to determine which ones of the storage-device switches 3 are connected with data storage devices 2 (i.e., to determine which ones of the slots corresponding respectively to the storage-device switches 3 have the data storage devices 2 inserted therein). According to some embodiments, with respect to each of the storage-device switches 3, the relay device 41 may send an identifier information request to the storage-device switch 3 and further to a data storage device 2 (if any) connected with the storage-device switch 3 for the piece of storage identifier information stored in the data storage device 2. When the relay device 41 receives a piece of storage identifier information from a specific storage-device switch 3, it is determined that the specific storage-device switch 3 is connected with a data storage device 2; on the other hand, if no storage identifier information is received from the specific storage-device switch 3, it is determined that the specific storage-device switch 3 is not connected with any data storage device 2.

Next, in Step 302, the relay device 41 of the management module 4 turns off any of the storage-device switches 3 that is not connected with a data storage device. At this moment, every data storage device 2 that is currently installed in the server is in the enabled state because the storage-device switch 3 connected thereto is turned on. For convenience of discussion, the data storage devices 2 that have been installed in the server when the initialization procedure is being performed (i.e., those who undergo the initialization procedure) are referred to as "initial data storage devices" hereinafter.

In Step 303, the relay device 41 of the management module 4 obtains, for each of the initial data storage devices 2 (which is in the enabled state as previously mentioned), the piece of storage identifier information corresponding to the initial data storage device 2. In embodiments where which ones of the storage-device switches 3 are connected with data storage devices 2 is determined in Step 301 based on pieces of storage identifier information received by the relay device 41 from the storage-device switches 3, in Step 303, the relay device 41 may readily utilize the pieces of storage identifier information received in Step 301 from the storage-device switches 3 connected with the initial data storage devices 2.

In Step 304, for each of the initial data storage devices 2, the relay device 41 of the management module 4 verifies identity of the initial data storage device 2 by determining whether the piece of storage identifier information corresponding to the initial data storage device 2 (obtained in Step 303) matches any of the multiple pieces of default identifier information contained in the allow-list stored in the memory device 43, so as to generate a determination result indicating whether said piece of storage identifier information matches any of the multiple pieces of default identifier information. For example, in an embodiment where each piece of default identifier information includes a VID, whether a piece of storage identifier information matches any of the pieces of default identifier information is determined by determining whether the VID contained in the piece of storage identifier information is identical to the VID included in any of the pieces of default identifier information. In another embodiment where each piece of default identifier information includes a data-storage-device type that corresponds to at least one VID, whether a piece of storage identifier information matches any of the pieces of default identifier information is determined by determining whether the VID contained in the piece of storage identifier information is one of the at least one VID corresponding to the data-storage-device type included in any of the pieces of default identifier information.

For convenience of discussion, an initial data storage device 2 that stores a piece of storage identifier information which matches a piece of default identifier information in the allow-list is referred to as "verified data storage device", and an initial data storage device 2 that stores a piece of storage identifier information which does not match any piece of default identifier information in the allow-list is referred to as "unverified data storage device".

In Step 305, for each unverified data storage device 2, if any, the relay device 41 of the management module 4 transitions the unverified data storage device 2 from the enabled state to the disabled state by turning off the storage-device switch 3 connected to the unverified data storage device 2. In this way, connection between the bus-channel switch 42 (as well as the controller 5) and the unverified data storage device 2 is disabled. In Step 305, the relay device 41 also generates, for each verified data storage device 2, a piece of log data, and stores the piece of log data into the register map in the second memory block 432. The piece of log data contains the verification code that is stored in the first memory block 431 and that corresponds to the piece of default identifier information which matches the piece of storage identifier information stored in the corresponding verified data storage device 2.

According to some embodiments, the piece of log data for the verified data storage device 2 may also contain the piece of storage identifier information of the verified data storage device 2, or a portion of the piece of storage identifier information of the verified data storage device 2.

According to some embodiments, the piece of log data for the verified data storage device 2 may include, in addition to the verification code, at least a portion of the piece of default identifier information that matches the storage identifier information of the verified data storage device 2. For example, in an embodiment where each piece of default identifier information contains a VID, the piece of log data for the verified data storage device 2 includes the VID contained in said piece of default identifier information.

According to some embodiments, the piece of log data for the verified data storage device 2 may contain other information related to the verified data storage device 2, such as the device address of the verified data storage device 2. In some embodiments where the pieces of storage identifier information also include the device addresses, the management module 4 may acquire the device addresses of the verified data storage devices 2 from the pieces of storage identifier information obtained therefrom. In some other embodiments, the device addresses of the verified data storage devices 2 are received by the management device 4 from the storage-device switches 3 connected with the verified data storage devices 2 along with the pieces of storage identifier information in Step 301. In some embodiments, device addresses of all authorized data storage devices are pre-stored in the memory device 43 or another memory device in the server that is accessible by the management module 4, and the management module 4 may obtain the device addresses of the verified data storage devices 2 from the memory device 43 or said another memory device based on, for example, the VIDs of the verified data storage devices 2.

According to some embodiments, the pieces of storage identifier information of the data storage devices 2 may each include a port number that is assigned to one of the communication ports 421 of the bus-channel switch 42 and that corresponds to the storage-device switch 3 corresponding to the data storage device 2. In some embodiments where which ones of the storage-device switches 3 are connected with data storage devices 2 is determined in Step 301 based on pieces of storage identifier information received by the relay device 41 from the storage-device switches 3, the management device 4 may receive, from the storage-device switches 3 connected with the data storage devices 2 and along with the pieces of storage identifier information in Step 301, the port numbers assigned respectively to the communication ports 421 that are connected to the storage-device switches 3. In these cases, each piece of log data generated in Step 305 may also include a port number related to the corresponding verified data storage device 2.

Figure 4:
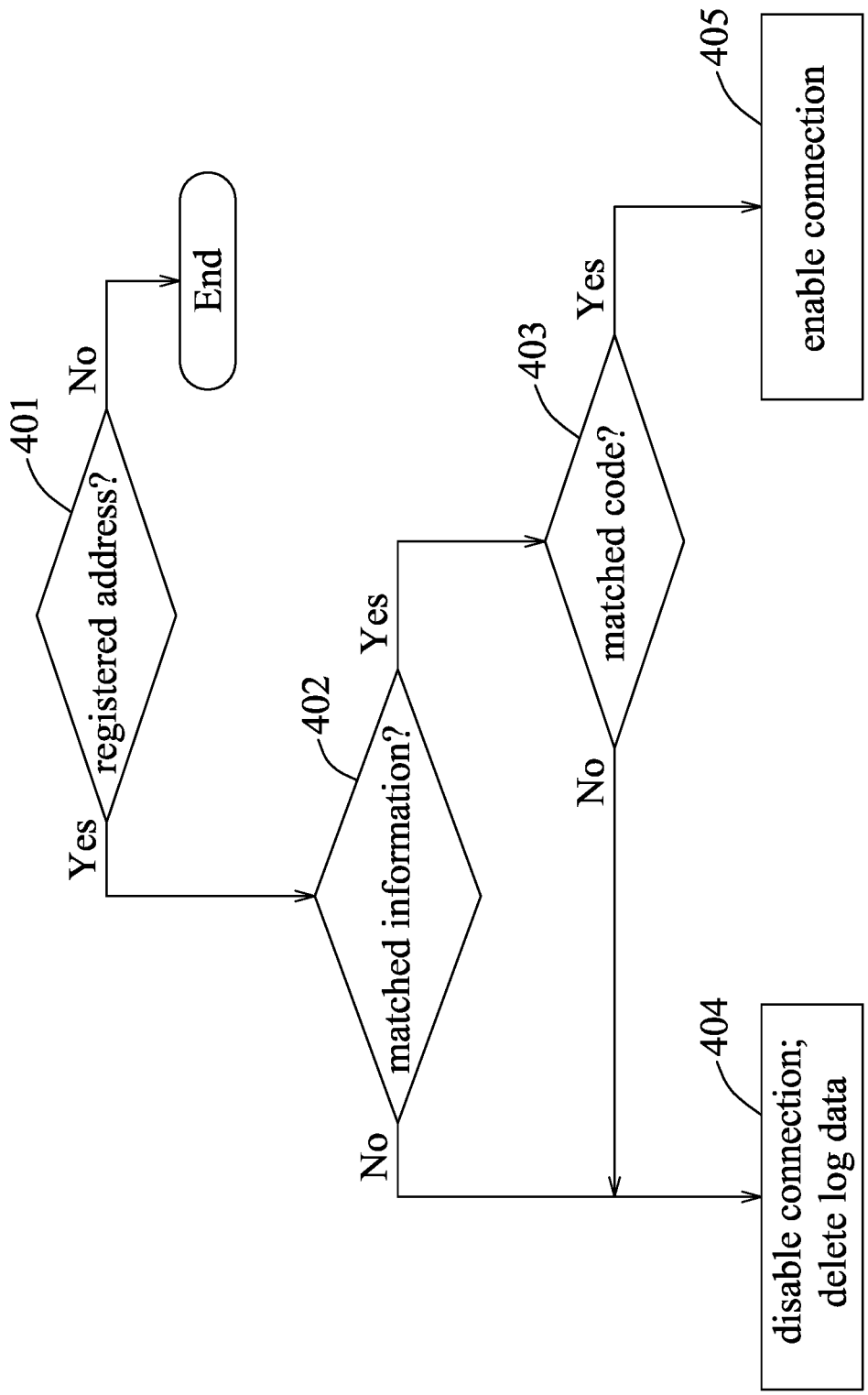
FIG. 4 is a flow chart that exemplarily illustrates a double-check procedure to be performed by the server according to an embodiment of the disclosure.

Referring back to FIG. 1, the controller 5 is configured to issue an access command through the control bus to the management module 4 after the initialization procedure is completed, and the management module 4 is configured to perform a double-check procedure upon receiving the access command. The access command contains a device address, and is issued for accessing a data storage device 2 corresponding to the device address. FIG. 4 exemplarily illustrates the double-check procedure according to an embodiment of the disclosure. Referring to FIG. 4, the double-check procedure includes Steps 401-405.

In Step 401, the relay device 41 of the management module 4 reads the register map stored in the second memory block 432, and determines whether the device address contained in the access command can be found in any piece of log data stored in the register map (that is, whether the device address is registered in the register map). If so, the process goes to Step 402; otherwise, the process ends. According to an embodiment, the relay device 41 may send an error message to the controller 5 when said device address cannot be found in any piece of log data.

In Step 402, the relay device 41 of the management module 4 reads the piece of storage identifier information stored in the data storage device 2 that is currently connected to the management module 4 and that corresponds to the device address contained in the access command (referred to as "target data storage device" hereinafter), and determines whether information contained in said piece of storage identifier information matches information contained in the piece of log data in the register map that includes the device address contained in the access command (referred to as "target piece of log data" hereinafter). Obviously, the target data storage device 2 is now in the enabled state. If the determination made in Step 402 is affirmative, the process goes to Step 403; otherwise, the process goes to Step 404. According to an embodiment, whether the information contained in said piece of storage identifier information matches the information contained in the target piece of log data may be determined by determining whether the VID contained in said piece of storage identifier information is the same as the VID contained in the target piece of log data.

In Step 403, the relay device 41 of the management module 4 reads the storage device code stored in the target data storage device 2, and compares the storage device code with the verification code contained in the target piece of log data to determine whether the storage device code matches the verification code. If so, the process goes to Step 405; otherwise, the process goes to Step 404. In Step 403, a comparison result is generated. The comparison result indicates that the target data storage device 2 is valid when the storage device code matches the verification code, and indicates that the target data storage device 2 is invalid when the storage device code does not match the verification code.

In Step 404, the relay device 41 of the management module 4 disables connection between the controller 5 and the target data storage device 2 to prevent the controller 5 from accessing the target data storage device 2, and deletes the target piece of log data from the register map. According to some embodiments, the relay device 41 disables said connection by turning off the storage-device switch 3 that is connected to the target data storage device 2, thereby transitioning the target data storage device 2 from the enabled state to the disabled state. In this way, connection between the bus-channel switch 42 and the target data storage deice 2 is also disabled since the target data storage deice 2 is in the disabled state. In some embodiments, the relay device 41 in Step 404 further controls the bus-channel switch 42 to not connect the controller 5 with any of the communication ports 421, or controls the bus-channel switch 42 to disable the connection between the controller 5 and the communication port 421 that has a port number corresponding to the target data storage device 2 (and the storage-device switch 3 connected to the target data storage device 2).

In Step 405 which is performed when it is determined that the storage device code from the target data storage device 2 matches the verification code from the register map, the relay device 41 of the management module 4 keeps the target data storage device 2 in the enabled state by keeping the storage-device switch 3 turned on, and controls the bus-channel switch 42 to connect a transmission path between the controller 5 and the target data storage device 2 (in this way, connection between the controller 5 and the target data storage device 2 is enabled), in order to enable the controller 5 to access the target data storage device 2. According to some embodiments, the relay device 41 may connect the transmission path between the controller 5 and the target data storage device 2 by controlling the bus-channel switch 42 to connect the controller 5 to the communication port 421 that has a port number corresponding to the target data storage device 2. Accordingly, the controller 5 may access the target data storage device 2 through said communication port 421 and the bus channel inside the relay device 41 which is connected to said communication port 421 (and also said storage-device switch 3). In an embodiment, in Step 405, the management module 4 controls the SMbus to be connected to only one of the multiple bus channels that are inside the relay device 41 and that are each connected to a different storage-device switch 3 and a different data storage device 2 for connecting the controller 5 and the target data storage device 2.

In summary, for each data storage device 2 installed in the server performing the initialization procedure, the server first detects the data storage device 2, and checks whether the data storage device 2 thus detected is an authorized device by using the piece of storage identifier information stored in the data storage device 2 and the allow-list stored in the first memory block 431, which is a non-volatile memory. Next, the server performing the initialization procedure generates a piece of log data for each data storage device 2 that is determined to be authorized, and stores the piece(s) of log data thus generated in a register map in the second memory block 432, which is a volatile memory. Any unauthorized data storage device that is installed in the server is disabled in the initialization procedure. Therefore, a first barrier for preventing access to unauthorized data storage device(s) is set during the initialization procedure.

Once the initialization procedure is completed, the server only accesses and manages the data storage devices 2 that have passed the initialization procedure (i.e., the installed data storage devices 2 that have been verified (i.e., proven authorized) in the initialization procedure), thereby improving operation efficiency and saving management resources of the server. When an access command is issued from the controller 5 that intends to access a data storage device 2 located at a specific device address, the server performs the double-check procedure before allowing the controller 5 to access the data storage device 2. The server performing the double-check procedure first determines whether the data storage device 2 is present (i.e., being installed in the server) by conveniently and efficiently utilizing the register map stored in the second memory block 432. Next, the server performing the double-check procedure reads the piece of storage identifier information and the storage device code stored in the data storage device 2, and compares the piece of storage identifier information and the storage device code with relevant information contained in the register map, in order to determine whether the data storage device 2 truly is the data storage device 2 that has been installed at the address and proven authorized during the initialization procedure. This process further sets a second barrier for preventing the controller 5 from accessing an unauthorized data storage device, which may have been cunningly inserted into the server and bypassed the initialization procedure (e.g., by replacing an authorized data storage device 2 that has passed the initialization procedure with the unauthorized data storage device). In this way, both of reading malicious data (e.g., which may damage the firmware of the controller 5, or which carry a virus or malware) from the unauthorized data storage device and leaking confidential data to the unauthorized data storage device are prevented, and data stored in the server is secured.

In addition, utilizing the PLD to implement the management module 4 is beneficial in that the specification for internal devices of the management module 4, such as the number of the sets of connecting lines or the communication ports 421 of the bus-channel switch 42, can be easily modified to match a desired number of the data storage devices 2 to be installed in the server, without bringing about complicated wiring.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disklosed embodiment(s) but is intended to cover various arrangements included within the spirit and scope of the broadest interpretation so as to encompass all such modifications and equivalent arrangements.

What is claimed is:

1. A server, comprising:
    a management module including a memory device storing an allow-list that contains multiple pieces of default identifier information and a verification code, the management module being configured to be connected to a plurality of data storage devices, wherein each of the plurality of data storage devices stores a storage device code and a piece of storage identifier information that corresponds to the data storage device, and is in one of an enabled state where access thereto is allowed and a disabled state where access thereto is not allowed;
    wherein the management module is further configured to, when the management module is performing an initialization procedure and when the management module is connected to multiple data storage devices from among the plurality of data storage devices,
        for each of the multiple data storage devices that is in the enabled state, obtain the piece of storage identifier information corresponding to the data storage device,
        for each of the multiple data storage devices that is in the enabled state, determine whether the piece of storage identifier information corresponding to the data storage device matches any of the multiple pieces of default identifier information contained in the allow-list stored in the memory device, so as to generate a determination result indicating whether said piece of storage identifier information matches any of the multiple pieces of default identifier information, and generate a piece of log data when the determination result indicates that said piece of storage identifier information matches one of the multiple pieces of default identifier information.

2. The server of claim 1, further comprising:
    a controller connected to the management module, and configured to issue to the management module an access command that contains a device address;
    wherein the management module is configured to, upon receiving the access command from the controller,
        read the storage device code stored in one data storage device of the plurality of data storage devices that is connected to the management module, that is in the enabled state, and that corresponds to the device address contained in the access command,
        compare the storage device code thus read with the verification code contained in the allow-list stored in the memory device, so as to generate a comparison result indicating whether said one data storage device is valid or invalid, and
        when the comparison result thus generated indicates that said one data storage device is invalid because the storage device code read therefrom does not match the verification code contained in the allow-list, disable connection between the controller and said one data storage device to prevent the controller from accessing said one data storage device.

3. The server of claim 2, wherein the management module is further configured to:
    when the comparison result generated after receiving the access command from the controller indicates that said one hard disc device is valid because the storage device code read therefrom matches the verification code contained in the allow-list, enable connection between the controller and said one data storage device to enable the controller to access said one data storage device.

4. The server of claim 3, wherein the management module further includes:
    a bus-channel switch connected to the controller; and
    a relay device connected between the bus-channel switch and the memory device, the relay device being configured to be connected to the plurality of data storage devices, and configured to
        during the initialization procedure, obtain the pieces of storage identifier information corresponding to the multiple data storage device that are connected to the management module through the relay device;
        after receiving the access command issued by the controller, read the storage device code stored in said one data storage device which corresponds to the device address contained in the access command;
        when the comparison result generated by the management module after receiving the access command from the controller indicates that said one data storage device is valid, control the bus-channel switch to connect a transmission path between the controller and said one data storage device so as to enable connection between the controller and said one data storage device; and when said comparison result generated by the management module indicates that said one data storage device is invalid, disable connection between the bus-channel switch and said one data storage device.

5. The server of claim 4, further comprising:
multiple storage-device switches that are connected to the relay device and are controlled thereby, wherein each of the multiple storage-device switches is configured to be connected to one of the plurality of data storage devices that is in the enabled state only when the storage-device switch is turned on,
wherein the relay device is configured to:
  when the comparison result generated by the management module after receiving the access command from the controller indicates that said one data storage device is invalid, transition said one data storage device from the enabled state to the disabled state by turning off one of the multiple storage-device switches that is connected to said one data storage device; and
  when said comparison result generated by the management module indicates that said one data storage device is valid, keep said one data storage device in the enabled state by keeping said one of the multiple storage-device switches turned on.

6. The server of claim 4, wherein the relay device is further configured to, during the initialization procedure and for each of the multiple data storage devices that is in the enabled state,
determine whether the piece of storage identifier information corresponding to the data storage device matches any of the multiple pieces of default identifier information contained in the allow-list stored in the memory device so as to generate the determination result indicating whether said piece of storage identifier information matches any of the multiple pieces of default identifier information; and
when the determination result thus generated indicates that said piece of storage identifier information does not match any of the multiple pieces of default identifier information, disable connection between the data storage device and the bus-channel switch.

7. The server of claim 1, further comprising:
multiple storage-device switches that are connected to the management module and are controlled thereby, wherein each of the multiple storage-device switches is configured to be connected to one of the plurality of data storage devices that is in the enabled state only when the storage-device switch is turned on,
wherein, for each of the multiple storage-device switches, the management module is configured to switch on the storage-device switch so as to put the data storage device connected to the storage-device switch in the enabled state, and to switch off the storage-device switch so as to put the data storage device connected to the hard disc switch in the disabled state.

8. The server of claim 1, wherein the management module is further configured to, during the initialization procedure, for each of the multiple data storage devices that is connected to the management module and that is in the enabled state, when the determination result generated for the data storage device indicates that the piece of storage identifier information corresponding to the data storage device does not match any of the multiple pieces of default identifier information contained in the allow-list stored in the memory device, transition the data storage device from the enabled state to the disabled state.

9. The server of claim 1, further comprising the plurality of data storage devices.

10. The server of claim 1, wherein the management module is implemented by a programmable logic device (PLD).

11. The server of claim 1, wherein:
the memory device includes a first memory block and a second memory block, the first memory block being non-volatile memory and storing the allow-list, the second memory block being volatile memory; and
the management module is further configured to store the piece of log data thus generated into the second memory block.

12. The server of claim 11, further comprising:
a controller connected to the management module, and configured to issue to the management module an access command that contains a device address;
wherein the management module is configured to, upon receiving the access command from the controller,
  determine whether the device address contained in the access command can be found in any piece of log data stored in the second memory block,
  when it is determined that the device address contained in the access command can be found in a piece of log data stored in the second memory block, read the piece of storage identifier information stored in one data storage device of the plurality of data storage devices that corresponds to the device address, and determine whether said piece of storage identifier information matches said piece of log data, and
  when it is determined that said piece of storage identifier information does not match said piece of log data, transition said one data storage device from the enabled state to the disabled state.

13. The server of claim 12, wherein the management module is further configured to, when it is determined that said piece of storage identifier information does not match said piece of log data, delete said piece of storage identifier information from the second memory block.

14. The server of claim 12, wherein:
the second memory block also stores the verification code; and
the management module is further configured to,
  when it is determined that said piece of storage identifier information matches said piece of log data, read the storage device code stored in said one data storage device, and compare the storage device code thus read with the verification code stored in the second memory block so as to generate a comparison result indicating whether said one data storage device is valid or invalid, and
  when the comparison result thus generated indicates that said one hard disc device is invalid because the storage device code read therefrom does not match the verification code, transition said one data storage device from the enabled state to the disabled state.

15. The server of claim 14, wherein the management module is further configured to, when the comparison result indicates that the one hard disc device is invalid, delete said piece of storage identifier information from the second memory block.

16. The server of claim 14, wherein the management module is further configured to, when the comparison result indicates that said one hard disc device is valid because the storage device code read therefrom matches the verification code, enable connection between the controller and said one hard disc device to enable the controller to access said one hard disc device.

17. The server of claim 1, wherein:
each of the multiple pieces of default identifier information in the allow-list stored in the memory device includes a vendor identifier (VID) corresponding to the piece of default identifier information;
for each of the plurality of data storage devices, the piece of storage identifier information stored therein includes a VID corresponding to the data storage device; and
the management module is configured to determine whether the piece of storage identifier information corresponding to the data storage device matches any of the multiple pieces of default identifier information contained in the allow-list by determining whether the VID included in the piece of storage identifier information is identical to the VID included in any of the multiple pieces of default identifier information.

18. The server of claim 1, wherein the piece of log data that is generated when the determination result indicates that said piece of storage identifier information matches one of the multiple pieces of default identifier information includes at least a portion of said piece of storage identifier information.

19. The server of claim 1, wherein said piece of storage identifier information includes a device address corresponding to the data storage device that stores said piece of storage identifier information.

* * * * *